(12) United States Patent
Brandon et al.

(10) Patent No.: US 6,385,568 B1
(45) Date of Patent: May 7, 2002

(54) OPERATOR-ASSISTED TRANSLATION SYSTEM AND METHOD FOR UNCONSTRAINED SOURCE TEXT

(76) Inventors: Marek Brandon, 70 Montfort Road, Pincourt, Quebec (CA), J7V 3P2; Maria Veres, 6225 Northcrest, Apt. 204, Montreal, Quebec (CA), H3S 2T5; James Anglehart, 4532 Old Orchard, Nortre-Dame-de-Grace, Montreal, Quebec (CA), H4A 3B7

( * ) Notice: Subject to any disclaimer, the term of this patent is extended or adjusted under 35 U.S.C. 154(b) by 0 days.

(21) Appl. No.: 09/394,279

(22) Filed: Sep. 10, 1999

Related U.S. Application Data

(63) Continuation of application No. PCT/CA98/00549, filed on May 27, 1998.
(60) Provisional application No. 60/048,715, filed on May 28, 1997.

(51) Int. Cl.[7] .............................................. G06F 17/28
(52) U.S. Cl. .............................................. 704/7; 704/2
(58) Field of Search .............................. 704/2, 3, 4–8, 704/277; 707/500, 513, 536

(56) References Cited

U.S. PATENT DOCUMENTS

| | | | | |
|---|---|---|---|---|
| 4,641,264 A | * | 2/1987 | Nitta et al. ...................... | 704/3 |
| 4,954,984 A | | 9/1990 | Kaijima et al. ................. | 704/2 |
| 4,980,829 A | * | 12/1990 | Okajima et al. ................. | 704/2 |
| 5,005,127 A | * | 4/1991 | Kugimiya et al. .............. | 704/2 |
| 5,091,876 A | | 2/1992 | Kumano et al. ................. | 704/2 |
| 5,285,386 A | * | 2/1994 | Kuo ................................ | 704/2 |
| 5,311,429 A | * | 5/1994 | Tominaga ........................ | 704/2 |
| 5,353,221 A | * | 10/1994 | Kutsumi et al. ................ | 704/5 |
| 5,490,061 A | * | 2/1996 | Tolin ............................... | 704/5 |
| 5,523,946 A | * | 6/1996 | Kaplan et al. .................. | 704/5 |
| 5,535,120 A | | 7/1996 | Chong et al. ................... | 704/2 |
| 5,587,902 A | * | 12/1996 | Kugimiya ....................... | 704/5 |
| 5,587,903 A | | 12/1996 | Yale ............................... | 704/1 |
| RE35,464 E | * | 2/1997 | Suzuki et al. .................. | 704/2 |
| 5,612,872 A | * | 3/1997 | Fujita ............................. | 704/3 |
| 5,646,840 A | * | 7/1997 | Yamauchi et al. .............. | 704/3 |
| 5,677,835 A | * | 10/1997 | Carbonell et al. ............. | 704/2 |
| 5,787,386 A | * | 7/1998 | Kaplan et al. .................. | 704/2 |
| 5,995,920 A | * | 11/1999 | Carbonell et al. ............. | 704/9 |

FOREIGN PATENT DOCUMENTS

| | | | | |
|---|---|---|---|---|
| EP | 0 737 928 | 10/1996 | ........... | G06F/17/28 |
| WO | WO 94/06086 | 3/1994 | ........... | G06F/15/36 |
| WO | WO 97/18516 | 5/1997 | ........... | G06F/17/28 |

OTHER PUBLICATIONS

"Technical Translation as Information Transfer Across Language Boundaries" by P.C. Ganeshsundaram—Journal of Information Science 2 (1980), Sep. 17, 1979, pp. 91–100.

* cited by examiner

*Primary Examiner*—Patrick N. Edouard
(74) *Attorney, Agent, or Firm*—Ogilvy Renault; James Anglehart

(57) ABSTRACT

The computer-based translation system allows a person having full understanding and competency in a language of an original source text to confirm the meaning of the source text without requiring knowledge of any other language so that data concerning the meaning of the original language text may be used to translate automatically the original text into the other language or other languages.

19 Claims, 2 Drawing Sheets

OPERATOR-ASSISTED TRANSLATION SYSTEM AND METHOD FOR UNCONSTRAINED SOURCE TEXT

This application is a continuation of PCT/CA98/00549 filed May 27, 1998 designating the U.S., now in the International phase, and claims priority of U.S. Provisional patent application Ser. No. 60/048,715 filed May 28, 1997.

FIELD OF THE INVENTION

The present invention relates to a computer-based translation system. More particularly, the present invention relates to a computer-based translation system in which a person having full understanding and competency in a language of an original source text to be translated provides and/or confirms the meaning of the text without requiring knowledge of any other language, so that data concerning the meaning of the original language text may be used to automatically translate the original text. The invention also relates to a computer-based translation system which automatically translates meaning code data representing a source text in order to obtain a translation in a particular language. The invention further relates to a method of translating in which meaning data concerning a source text is provided by a person familiar with the language of the source text without requiring any knowledge of another language, and then translating the meaning data into a translation destination text automatically without requiring any other understanding of the source language.

BACKGROUND OF THE INVENTION

In the field of automated translation systems, two approaches have traditionally been taken. In the first approach, artificial intelligence has been used to provide a best guess of the meaning of the source language in order to be able to generate automatically a translation of the source text. Such automated systems recognize parts of speech in the source language and this grammatical information is used in order to reconstruct in the destination language a suitable translation. When a word in the source language has two meanings, the most probable meaning based on the context is used in order to provide the translation The context is determined by the presence of other words. The output from such systems is a translated text which to date has been of dubious quality and reliability.

In the second type of translation systems, the automated translation systems provide an aid to translators in which the source text is automatically parsed grammatically and each possible translation for each word in the sentence may be selected by the translator in order to obtain efficiently the translation text. The translator must be knowledgeable as to the meaning of the original language as well as the destination language in order to be competent to confirm that the passing of the source text is accurate and to select the correct translations for each word in the sentence, and thus produce an accurate translation.

In the prior art, two attempts to provide a different type of translation system are worth noting. In U.S. Pat. No. 5,587,903 to Yale, a sentence input by a user is translated into Esperanto using his or her native language. This is similar to the second type of translation systems, except that the user is translating from his or her native language into Esperanto, and the translation includes databases containing relational and/or grammatical information about the Esperanto text. The result obtained is to map the thought of the sentences translated in a form recognizable by a machine. In "Technical translation as information transfer across language boundaries" by P. C. Ganeshsundaram, Journal of Information Science 2(1980), pp. 91–100, a framework for pre-editing a text in the source language to defme parts of speech of the words is disclosed. In this pre-editing, no translation or determining of the meaning of the words is carried out. For basic technical texts, it is proposed that the pre-edited text can be accurately machine translated using literal translations of the pre-edited words into one of many target languages.

OBJECTS OF THE INVENTION

It is a general object of the present invention to provide a translation system in which the burden of defining the exact meaning of a text to be translated is carried out by a person knowledgeable of the language and of the meaning of a text to be translated without requiring any knowledge of the language into which the text is to be translated. Data representing the exact meaning is stored in order to facilitate automated translation into one or more destination languages. For example, the author of a text who wants his or her text to be readily translated into other languages may use a text editor according to the invention in order to provide the necessary meaning data in order that translation can be done automatically without requiring any further linguistic data.

It is a further object of the present invention to provide an automatic translation text generator which creates a translation text from the product of a unilingual meaning editor.

SUMMARY OF THE INVENTION

According to a broad aspect of the invention, there is provided a translation system including a universal meaning editor having an input text storage means, an editor for allowing a user to ascribe a particular meaning to each word or group of words in the input text, and a language database means for containing all known meanings for each word or group of words in the source language. The translation system allows the user to select which of the known meanings for each word or group of words in the source text is the correct meaning for each word or group of words, and the result of the user selection is used to generate meaning code data representing the meaning of the original language text.

Preferably, the meaning code data is sufficiently explicit to permit automatic translation into a plurality of languages. In one preferred embodiment, the meaning code data also includes layout information so that the automatic translation generator may produce output text respecting the same format as the input text, and in particular the automatic translation generator may scale the size of the translated text in order to generate a text object having dimensions specified in the original source text format. It is also a preferred feature of the present invention that the automatic translation generator be a plug-in software module for use with existing text editors or HTML display software, otherwise known as web browsers.

Also preferably, the unilingual meaning editor is configured so that when it encounters a word not found in its language database, the editor may allow the user to input a suitable synonym. The editor may record the unknown word and create a pointer to the closer synonym. Additionally, it may be preferable that the unilingual meaning editor permits the user to reconstruct the original sentence in the case that a word or group of words are not found in the language database. The reconstructed sentence may thus be a sentence more likely to be easily defined using the existing language database. Also preferably, it may be desirable to permit the unilingual meaning editor to leave a word or group of words untranslated in order to appear in the translation text in italics, quotation marks or some other special script identifying the words as being original foreign words (such as "Katakana" in Japanese). Words which are not found in the language database may also be automatically reported by telecommunication means to the language database creator for the purposes of revision of the language database and implemented in a future release. In the latter case, the language database used may be an on-line database or may be updated at regular intervals by telecommunication means.

In some cases, it is desirable to create a language database which requires a degree of specification by the user of meaning relevant to a particular set of languages, which set is less than a complete set of languages, in order to simplify the degree of detail required in order to ascertain the exact meaning of the input text. For example, a language database for the English language may be created in order to ascertain the meaning in the English language for the purposes of producing a translation into any romance language. A separate English language database may be created in order to ascertain the meaning for the purposes of translating the meaning code data into Japanese, Chinese and Korean.

If the unilingual meaning editor has been used in order to ascertain the meaning of an input text for romance languages, the meaning editor used for ascertaining the meaning of a text for automatic translation into the oriental languages may be provided with the meaning code data from the romance languages in order to reduce the time that the user must spend in ascribing the necessary meaning to generate meaning code data which can be used for translation of the input text into oriental languages. As can be appreciated, the automatic translation generator according to the invention would be capable of performing a slightly less than perfect translation into one language when basing the translation on meaning code data not intended to encompass the one language.

The invention also provides within the context of an automatic translation generator a user-controlled editor for carrying out refinements or stylistic changes to the translation text in which any potential ambiguity which may appear in the translation text may be eliminated by providing the user with some or all of the meaning code data associated with the text being revised, and preferably in the language of the translated text so that the reviser of the translated text need not have any knowledge of the source language. It is also preferred that the meaning code data include a complete specification of the original input text so that a reverse translation back into the original input language always provides an exact replica of the original text.

According to the invention, there is provided a translation system for translating an input text into a meaning code using input from a user requiring knowledge of a language of the input text in which the meaning code is to be converted by a machine translation system to an output text in at least one different language. The system comprises parser means for recognizing sentences and words within the sentences of the input text. The parser means locates the words in a term database. A meaning editor means is provided for obtaining from a meaning database a plurality of meaning descriptions in the language of the input text for each of at least some of the words having plural meanings in the term database, for receiving from the user a confirmation of which of the plurality of meaning descriptions is appropriate for each of the words, and for receiving from the user an indication of a part of speech of the words in each of the sentences. Meaning code generator means are also included for receiving data from the meaning editor means and for generating a meaning code corresponding to the input text. The meaning code comprises an identification code corresponding to a meaning for each word found in the input text and sufficient grammatical information to allow for the meaning code to be accurately machine translated in any one of the at least one different language. Preferably, the meaning editor means further comprise input means for allowing a user to provide input in response to at least one of the words in a given sentence not being found in the term database. Also preferably, the system includes means for adding a new entry in the term database and to link the new entry to at least one meaning description in the meaning database, so that a quality of the term database can be developed with use of the system. Similarly, the system preferably includes means for editing the term database to change links between entries in the term database and meaning descriptions in the meaning database. The meaning editor means for receiving from the user an indication of a part of speech of the words in each of the sentences may prompt the user to provide grammatical information which is not required by the language of the input text and is useful in providing an accurate translation into at least one of the at least one different language, and preferably the meaning code is complete to allow for translation into at least two different languages.

The invention further provides a translation system for translating the meaning code into an output text, the meaning code comprising an identification code corresponding to a meaning for each word found in the input source text and sufficient grammatical information. This system comprises a meaning code to destination language database means for providing a translated term corresponding to each identification code in the meaning code, and sentence builder means for compiling the output text using each translated term and grammatical information for each sentence structure contained in the meaning code.

The invention also provides a method of human-assisted machine translating an input text in one language to obtain an output text in at least one different language, the method comprising the steps of:

defining a part of speech and a meaning of words in each sentence of the input text using an editor in the language of the input text, the meaning defined for each one of the words being derived from a predetermined meaning database having a set of meanings and corresponding meaning codes;

storing information including meaning codes derived from the previous step in a meaning code file;

providing a machine translator apparatus for machine translating the meaning code file to one of the at least one different language, the translator apparatus including a database of translated terms corresponding to the meaning codes; and generating the output text from the meaning code file using the machine translator apparatus.

BRIEF DESCRIPTION OF THE DRAWINGS

The invention will be better understood by way of the following detailed description of the preferred embodiment with reference to the appended drawings in which.

DETAILED DESCRIPTION OF THE PREFERRED EMBODIMENTS

In the preferred embodiment, a computer system such a general-purpose personal computer is provided with software to provide specific functions as will be described hereinbelow.

Figure 1:
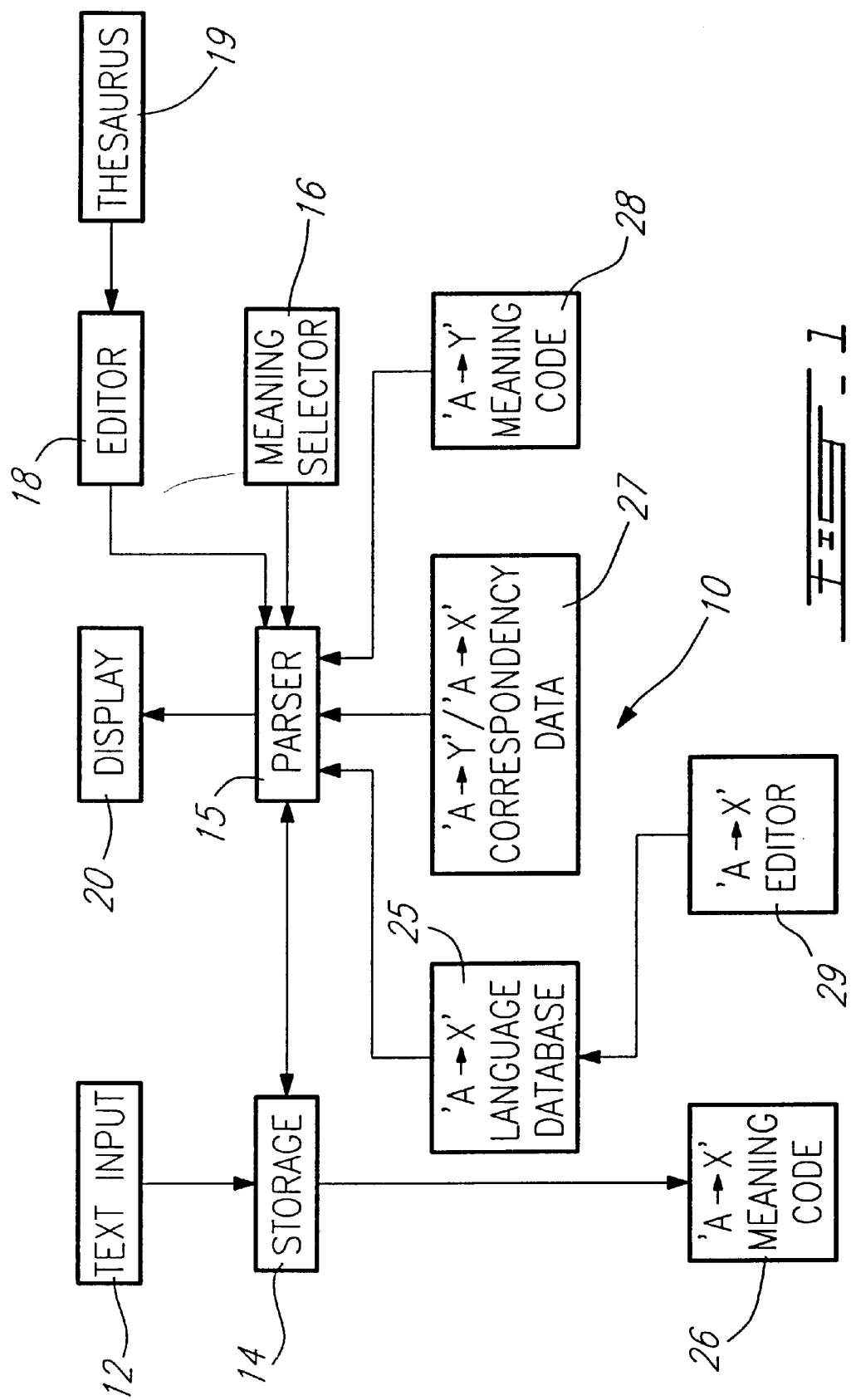
FIG. 1 is a schematic block diagram of the unilingual meaning editor according to the preferred embodiment.

As shown in FIG. 1, the unilingual meaning editor 10 comprises text input means 12 such as a communications interface or any other suitable source of text data. A storage memory 14 is used to hold the input text as well as a temporary file for the output meaning code data. A grammatical parser 15 parses the sentences in the input text stored in memory 14 and displays the parsed sentences on a display 20 identifying the particular parts of speech for each of the words and identifying the most probable or simply the first meaning of each of the words in the sentence being displayed. Software grammar parsers per se are known in the art. The language database 25 provides word definition and part-of-speech data to the parser along with grammar requirements for the set of languages into which the meaning code data is intended to be translated. The database 25 combines the term database, which includes a list of all words and expressions in the 'A' language which are matched with a meaning in the meaning definition set, with the database of meanings which includes the corresponding identification codes used to build up the resulting meaning code.

The parser 15 allows the user to select the appropriate meaning for each of the words or group of words appearing in the sentence using a meaning selector 16 which may be part of a graphical user interface. The user is also required to provide grammatical information unrelated to the original language or the meaning in the original language which, however, may be required in order to produce the translation in the languages into which the meaning code data is to be translated. For example, it may be necessary to identify the gender of a person in order to be able to translate words associated with that person correctly in another language, whereas in the original language such gender information is not required. In the case that the original sentence structure is simply too difficult to easily define the meaning of the terms therein, an editor 18 is provided to change the original sentence in order to facilitate definition or specification of the meaning of the words contained in the sentence.

The meaning selector 16 may be provided by software which causes a window to be displayed indicating the definitions which are possible for a given word or group of words appearing in the sentence which is provided in a main display window with the word or group of words appearing highlighted. Using the graphical user interface, the user selects the particular definition of the word or group of words which best suits the meaning in the original language. In the case that a word or group of words has an unambiguous definition in the language or the plurality of languages into which the input text is to be translated, there is no need to select one of a plurality of meanings using the meaning selector although the part of speech still needs to be confirmed.

When a word or group of words is not found in the term database of database 25, thesaurus means 19 offers the user a reference tool for finding an alternate word or expression having the same meaning in the language of the input text which can be substituted by the user for the orginal word or group of words is not found in the term database of database 25. The thesaurus means may also provide dictionary definitions of words, in addition to synonyms and antonyms.

As previously mentioned herein, any word or group of words which cannot be defined using the terms found in the language database 25, the meaning selector provides the option that the particular term be left untranslated since the term is to be considered to be a new term, as of yet undefined in other languages, or the term is a trade mark, etc. In such case, the meaning selector is used merely to designate the part of speech for the word or group of words.

As can be appreciated, the source of the language database 25 could be an online source in order to ensure that the database 25 is up-to-date and complete. When a word in the input text 12 cannot be found in the language database 25, it would be possible to provide communication means (e-mail, telephone or the like) for the user to communicate with the compiler of the language database 25 in order to inform the database compiler that the specific word or group of words cannot be found at all within the language database or that the specific meaning intended for the word or group of words cannot be found within the language database. The language database compiler can then provide an update to the language database.

The meaning database in database 25 cannot be edited by the user, but rather the inventory of meanings may only be corrected or expanded by the producer of the software. However, to facilitate the user's own editing of text to generate meaning code, an editor 29 is provided to allow the user to create new terms in the term database and to link them to established meaning entries in the meaning database of database 25. The editor 29 can also be used to change the links between an existing term in the term database and entries in the meaning database. This allows the user to create, for example, a new entry for "flapjack" and link it to the meaning definition "(noun) thin cake cooked on a pan or griddle" previously only linked to the term "pancake". As another example, the existing term "plug" (meaning as a verb to connect) could have an extra link added to the definition "(verb) to advertise or promote by way of an action" previously only linked to "pitch". The database 25 may thus be improved to best suit a user's needs over time with use by the user.

Updates to database 25 which do not change meaning identification codes or definitions may be implemented regularly, while updates that create new meaning identification codes require corresponding updates to the Readers translating the meaning code, and thus should not be as frequent. To ensure backward compatibility, editor 10 may include meaning identification codes in the meaning code 26 generated which includes the improved new meaning identification code according to a most recent version (a more accurate meaning) along with the old meaning identification code for older versions (a less accurate meaning), so that the Reader software may use the most recent meaning code it is able to recognize, while not refusing to provide a translation because of incompatible versions.

When the unilingual meaning editor 10 has been used to define the meaning of the entire input text, the parser 15 sends a signal to the storage means 14 to place the meaning code data into an output file 26. The output file 26 may be communicated by electronic means to the person who wishes to obtain a translation of the input text. The meaning code data may be used within a same computer on which the translation system operates in order to be able to proceed automatically with the generation of a translation. In the preferred embodiment, the meaning code data includes information concerning the specific definitions of each word or group of words appearing in the input text as well as the grammatical attributes for each word or group of words and the relationship between the words in the input text. In the preferred embodiment, additional information is contained in the meaning code data 26 in order to ensure that a translation of the meaning code data back into the original language of the input text will generate an exact copy of the input text. Therefore, in the case that the editor 18 was used to restructure a sentence or to change one word for a synonym in order to ascribe a meaning to the original input text which is closer to the definitions found in the language database, the meaning code data contains additional information concerning the original words or group of words which were replaced by substitutes using editor 18 before selecting an appropriate meaning.

As shown in FIG. 1, the unilingual meaning editor 10 is supplemented with a memory 28 for storing meaning code data created from a previous revision of the original text for the purposes of generating the meaning code data for use with an automatic translation generator for a language or group of languages (e.g. languages 'Y') different from the language or group of languages corresponding to the language database 25 (e.g. languages 'X'). A correspondence database 27 between the two different destination languages is thus also provided and the meaning code data 28 for the other language along with the correspondence table data 27 is provided to parser 15 in order to provide on display 20 the input text 12 already parsed and with meaning defined, inasmuch as there are common similarities between the two destination languages (e.g. between 'X' and 'Y').

The user of the unilingual meaning editor is then required merely to specify those meanings and provide the grammatical parts of speech interpretation information which are unique to the language in database 25. Since the bulk of the grammatical and meaning selection has already been done for the previous language, the ability to generate the output meaning code for the destination language corresponding to database 25 can be done relatively quickly. As can be appreciated, the preferred embodiment offers interoperability between destination languages or groups of destination languages while using the unilingual meaning editor in case that the person using the unilingual meaning editor has the task of defining the meaning of the input text for many different language groups (e.g. Romance, Oriental, Indian, etc.).

Figure 2:
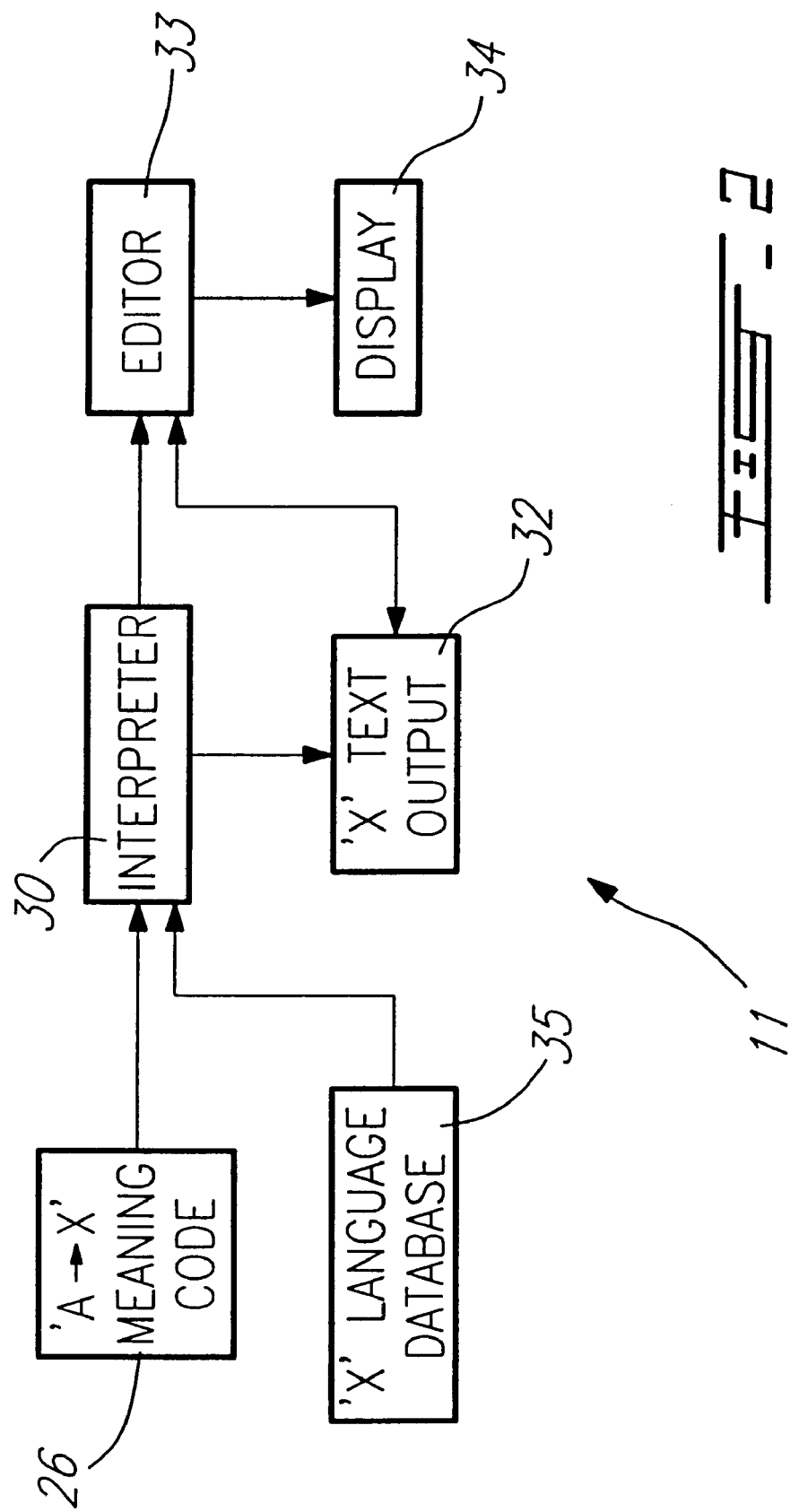
FIG. 2 is a schematic block diagram of the automatic translation generator according to the preferred embodiment.

With reference to FIG. 2, the automatic translation generator 11 will now be described. The meaning code data file 26 is part of a computer memory which is read by an interpreter 30. The interpreter 30 obtains from a language database 35 specific to the language into which the meaning code data is to be translated. For each word or group of words, the associated meaning code is looked up in the language database in order to obtain the correct term. The part of speech information and relationship information with respect to other words in the sentence is obtained from the meaning code data in order to change the form of the word or group of words in accordance with grammatical rules included in the language database 35. For example, verbs need to be conjugated in languages which involve verb conjugation. Some of the grammar information may not be required in the destination language and, as such, some of the meaning code data may not be used by interpreter 30 when producing the output text in the destination language.

The output text in the destination language is stored in a memory 32 and an editor system 33 including a display window 34 is provided to handle post automatic translation editing in the event that the person receiving the translation in the destination language wishes to make stylistic changes to the translation text. The editor 33 is provided not only with the text output from memory 32 but also with the appropriate information concerning the definitions of the terms in the destination language obtained from the language database 35 which correspond to the meaning codes responsible for producing the output text. The editor 33 may also display the grammatical relationship between the terms in the translation text in order to provide the person using editor 33 with a greater understanding of the translation text in order to make it easier to carry out corrections which still remain faithful to the original meaning of the text in the source language.

It is presumed that the person operating editor 33 may have no knowledge of the original language. However, in the special case that the person operating editor 33 has knowledge of the original language, the original language text could also be produced alongside the translation text by providing interpreter 30 with access to the information contained in the original language database 25 and outputting to the editor 33 the original language text.

In the preferred embodiment, the input text may include format data and this format data may be passed through the unilingual meaning editor into the meaning code data 26. In the case of a HTML text for a web browser, the input data format may include specifications as to text block position and dimensions in order that such information may be passed on to the meaning code data. As a consequence, the automatic translation generator 11 may have a module integrated with the interpreter 30 for the purposes of automatically generating an HTML output file which would resemble in layout and font style an original HTML file in the original language. In the preferred embodiment, the X language database 35 and the interpreter 30 may comprise the heart of a plug-in module to be integrated with a web browser. In this case, the meaning code data 26 would be included in the downloaded file to be viewed using a web browser.

With a view to improve understanding of the present invention, the preferred embodiment will now be described in greater detail in three specific portions. Firstly the meaning database and coding used for parts of speech in the meaning code will be described. Secondly, the meaning editor will be described. And thirdly, the Reader or machine translation apparatus for translating the meaning code into output text is described.

Catome Description

Within each language handled by the preferred embodiment, the linguistic databases and tables that drive its capabilities in that language are held within a logical structure which is termed a Catome. This new term is a contraction from the descriptive phrase "CATalogue Of MEanings" which accurately portrays the principal functions of this structure. The Catome comprises the term database and the meaning database.

High-level Structure

The primary needs that drive the high-level structure of the Catome are two-fold:

Size of the Catome—as small as possible

Speed using the Catome—as fast as possible

The preferred embodiment uses various techniques to reduce the size of the Catome—compression to reduce the size of the Catome during downloads and the use of model tables to reduce the storage space needed to hold the different forms of each noun and verb. To satisfy the requirement for speed, there are two indices that allow for direct access retrieval of information from the Catome.

To satisfy the need for a compact size and fast speed, the Catome contains the following databases, tables and indices:

Word/Meaning database

Sentence Structure database

Idiom database

Regular Verb model table

Irregular Verb model table

Regular Noun model table

Irregular Noun model table

Modal Verb model table

Pronoun model table

Contraction Model table

Word/Meaning Index by Word-Identifier

Word/Meaning Index by Meaning-Identifier

The essential difference between a database and a table in the preferred embodiment is that the databases contain further properties of the basic entities within them, whereas the tables are simple two-dimensional arrays of basic entities.

Database Overviews

Word/Meaning database

This database is the largest within the Catome. It contains all the words of the language with their associated properties. The database has ten logical sections each devoted to a specific part of speech:

1. Adjectives
2. Adverbs
3. Articles
4. Conjunctions
5. Interjections
6. Nouns
7. Prepositions
8. Pronouns
9. Verbs
10. Numbers The first digit of the Word-Identifier uses the corresponding number of the logical section it belongs in. This is necessary to help in situations where the same word exists in two or more different parts of speech, a situation very common in English. For example, the verb "to keep" has a usage and meanings entirely different to the English noun "keep" (the strongest part of a castle). The Word-Identifier is a 6-digit number qualified by a period and a two-digit usage field i.e. 999999.99

The two-digit usage field is highly specific to each language. Its primary use is to help the editor identify the particular way in which a modifiable part of speech (adjectives, adverbs, nouns and verbs) is being used by users as they type text in the input window of the Editor.

Properties

Some parts of speech have properties—some specific to the language, some relevant to other languages. Verbs can be transitive or intransitive; nouns can be "Proper", they can have a gender, they may exist only in the singular or plural form and so on. They may exist in some but not all regional dialects of the language. The most important property however is "Meaning". Apart from numbers (which are self-referring to meaning) all other parts of speech have a "Meaning-Identifier".

The Property of Meaning

Each word in the Word/Meaning Catome has a Meaning-Identifier associated with it. This allows us to differentiate between the different meanings that a word can have in a language. A word such as "fan" in English can be a verb "to fan", or a noun "a fan" which could mean either a device to move air, or a supporter of something. We differentiate between verbs and nouns by the first digit of the word-identifier. But for a specific word with different meanings within the same part of speech, we assign them different "Meaning-Identifiers". A "fan" as a noun therefore would have two entries in a Catome—each with a different "meaning-identifier" to differentiate between the device to move air and a human person who is a supporter of something.

Meaning Loops

In order to act as a thesaurus and lexicon, the inventors have evolved the concept of "Meaning Loops". Each "meaning identifier" is part of a "meaning loop" that consists of other words with the same meaning. Each word in the Catome is linked to a "meaning loop" through its "meaning identifier" acting as the key. But this concept is extended. Each "meaning loop" has additional pointers: the first to a higher "class of meaning", the second to a lower class of meaning loop. For example, consider the word "male" being used as a noun. It points to a meaning loop that has synonyms for "male" such as "man", "stud", etc. That meaning loop points to a higher class meaning loop that contains words such as "being", "person" etc. It also points to a lower class of meaning that contains words such as "man", "cob", "boy", "stallion" that contain "maleness" in their meanings.

Meanings and Meaning Loops are common across all Catomes—it is the meaning that is derived from the text being typed by the user, and it is those meanings which are imbedded in the meaning code or CCML language to be interpreted by other language readers. The user can ensure that the meaning of their words is precise through interaction with the Editor. The meaning-identifier will target the correct word to use in automatic translation by a Reader for another language.

Sentence Structure Database

Words and meanings are crucial in achieving the preferred goal of 100% translatability into other languages. But taken alone, they cannot do that. It is the ability to recognize the sentence structure being used that is the other component. The preferred embodiment has a database of generic sentence structures that act as a model to determine where the grammatical components of the sentence are to be found, and the relationships between them.

The key to sentence structure is to determine which "Verb Phrase" is being used in the sentence. The main verb phrase in the sentence points to a set of generic sentence structures supporting that specific "verb phrase" which are then used by the Editor to identify the subject, object, subordinate clauses, adverbial phrases and so forth—the grammatical components of the sentence. Sentence structures are themselves classified into "positive", "conditional", "querying" and "imperative" sub-types. There then exist a "negative" form of each sentence type within each sub-class. (An 'imperative' sentence structure such as "Go Away!" has its "negative" form of "Do not go away!") The sentence structures use a generic coding scheme to show where words from the different parts of speech are to be expected in the input text.

In the above example, the verb is represented as "9*0.8*"; the "9*" indicates that any verb can be used, but only in its imperative usage—represented by the two-digit qualifier of usage "8*" following the period.

Idiom Database

Within the Idiom database can be found expressions and phrases which have a meaning that would not be conveyed merely by translating their constituent words. The sentence "The reason for the breakdown was the dying battery and not the starter motor, an entirely different kettle of fish" uses the idiom "different kettle of fish". If this phrase were translated into other languages, it would not help the reader understand the meaning of the phrase nor its influence over the meaning of the whole sentence.

The Idiom database contains a current list of such idioms, cliches and other multi-word phrases in common usage. Each is assigned an "Idiom Identifier" and also an equivalent phrase that conveys the meaning more accurately. In the example used earlier, the phrase "different matter" would be attached to the generated meaning code or CCML code from the Editor. If there were no equivalent idiom in another language, the reader for that language would show the translated equivalent of "different matter" rather than translate the original idiom. An equivalent idiom in another language exists if it has an "Idiom Identifier" which is the same as the that of the original idiom.

Table Overviews

Regular Verb Model Table

For each type of regular verb within the language, there exists a full declension of the verb for each tense that is in current usage in that language. The table also identifies (where appropriate) infinitives, gerunds and past participles.

Irregular Verb Model Table

For each specific irregular verb type within the language, there exists a full declension of the verb for each tense that is in current usage in that language. The table also identifies (where appropriate) infinitives, gerunds and past participles. In addition, a regular verb is considered to be irregular if the verb's declension differs between regional versions of the same language. The verb "to dive" in English is considered irregular because the past participle differs from "dived" to "dove" between British and American usage.

The concept of irregular verb type arises from languages having some irregular verbs based on another unique irregular verb. The verb "to become" in English follows the irregular verb model for the verb "to come" as a good example.

Regular Noun Model Table

For each type of regular noun within the language, there exists a table that models the way that the noun is suffixed in particular usage within a sentence structure. In English, this table lists the following situations for noun endings:

| Noun Singular | eg: | Bus Train Plane | City |
| Noun Plural | eg: | Buses Trains Planes | Cities |
| Noun Singular Possessive | eg: | Bus's Train's Plane's | City's |
| Noun Plural Possessive | eg: | Buses' Trains' Planes' | Cities' |

Other languages would list their particular suffix usage. French, for example, does not have the grammatical concept of a possessive suffix for nouns and the French table would not list these situations.

Irregular Noun Model Table

Some languages have nouns that do not follow regular models or they are suffixed differently depending on the regional variant of that language. Also, nouns that can be used in a "singular" or "plural" context only would be listed in this table. English has examples such as "Fish" and "Men". These situations are identified and listed in the Irregular Noun Model Table.

Modal Verb Model Table

Lists the uses of the modal verbs. These include the words should, would, can, will, may, ought, dare and might as well as the ubiquitous "be" and "have". These modal verbs precede and modify the meaning of the following verb. "Be" and "have" are used extensively as the basis of many tenses in English, for example the passive past perfect "I have been misled." The modal verbs have their own sentence structure entries in the Sentence Structure database because they are a constituent part of the "Verb phrase" by which the Sentence Structure database is organized.

Pronoun Model Table

A table that contains all the pronouns of the language and their different forms. In English we would find:

| I | Me | My | Mine |
| You | You | Your | Yours |
| He | Him | His | His |
| She | Her | Her | Hers |
| It | It | Its | (Its) |
| We | Us | Our | Ours |
| You | You | Your | Yours |
| They | Them | Their | Theirs |

Contraction Model Table

A table that lists all the commonly found contractions with their fully expanded form commonly found in the language of the Catome. These apply typically to pronoun subjects followed by a modal verb, or to the negative use of a modal verb. Some contractions have two separate expansions—for example in English "I'd" is a contracted form of "I had" or "I would". The context usually defines which expanded form applies. The Contraction Model Table lists two entires in this instance.

Index Overviews

Word/Meaning Index by Word-Identifier

This index associates a word in the language with its corresponding entry in the Word/Meaning database. Used in the Editor when creating the meaning code or CCML language, this index allows for the instant look-up of words as they are typed in the Editor's input window.

Word/Meaning Index by Meaning-Identifier

In the Reader, the main retrievals from the Word/Meaning database are meanings taken from the inter-lingua CCML to be translated into the appropriate words in the Reader's language. This index allows for instant direct retrieval from the Catome.

Catome Operating Modes

Development

The Catomes are held on Microsoft Access databases. They are updated and expanded by linguists. There are two other databases on the development side that the customer never sees. These are the:

Universal Meaning Identifier Database

Universal Idiom Identifier Database

These two databases integrate meanings and idioms in each different language.

Product

For both the Editor or Reader, the Catome provided is in "read-only" mode and cannot be changed by the user. It cannot be accessed directly by the user; it is accessed solely by Linguistic Modules to provide data to specific internal tasks within the Editor or Reader.

Editor Description

Introduction

For every input or source language supported by the preferred embodiment, there is a unique Language Editor product. These may be sold over the Internet using electronic commerce transactions based on credit card processing. The Editor can be activated as an add-on to Microsoft's Word, Internet Explorer, Outlook, Qualcast's Eudora, Netscape Communicator and Corel's WordPerfect software. In any of these settings, the Editor is activated from a windows pull-down menu.

The first function of the Editor is to scan text typed by the Editor user, and through a dialogue of pop-up windows, ensure that the meaning of each word is identified and that each sentence is grammatically correct.

The second main function of the Editor is to take the sentence and translate it into a proprietary CCML language or meaning code. The resulting CCML can be read and translated into any language supported by a compatible Reader software.

Installation

Customers wishing to obtain a copy of the Editor may download the product from a web site using an Internet browser. The Editor is preferably "locked" against illegal copying and software piracy. As installation starts, the customers are invited to complete a secure HTML form with their credit card information and demographic data (optional). Once they send off the form from their browser, and the transaction is accepted, they receive a unique, one-time "unlock key" that will allow the installation to proceed.

During installation, the users are asked which regional language they would like to use. For the English language the choices would be:

UK English
US English
Canadian English
Australian English
Similarly, for example, for French, the Reader offers:
Paris French
Quebec French
Belgian French
Swiss French The user can always change this regional language setting through a pop-up menu at any time.

Starting the Editor

The Editor in the preferred embodiment is activated through a pull-down window (normally "tools") in the menu bar of the text processor, Internet Browser of word processing product. Instead of typing into those products, the user is presented with an Editor Input window. The user types text in this window, a sentence at a time and ends the sentence normally with a period, exclamation mark, question mark or a colon. They are invited to press F7 if the sentence has indeed been typed completely.

Linguistic Processing

Linguistic Step 1

The first step involves a word-by-word translation into meaning code, i.e. the Catome-to-Catome Meaning Language or just CCML for short. Each word is compared to see if it matches a word in the Catome or term database. The Catome is in fact a combination of both the term database and the meaning database.

If the word does not exist, a pop-up window appears offering the user three choices:

1. Use the word as typed. It will appear untranslated to someone reading the text with a Reader for a different language.
2. Change the word back in the input window and re-submit the sentence.
3. Select the dictionary function and get a list of words from the Catome with closely associated spelling, then choose the word that you meant to type.

If the word does exist, a pop-up window appears if the Catome has several entries for that word. Listed in this window are each entry found in the Catome, its part of speech (i.e. adjective, noun, verb etc.) and a close synonym to establish the specific meaning of that entry in the Catome. The user selects the entry with the desired meaning. Once all the words have been processed, the Editor prepares the CCML equivalents for each translatable word, using the "Meaning Indicator" from the Catome as the CCML value for each selected or unambiguous word.

Linguistic Step 2

The CCML sentence is scanned for Idioms (including cliches and other multi-word phrases or expressions). If there is a match between CCML words and an entry in the Idiom database within the Catome, the Catome returns an "Idiom Indicator"—a number that uniquely identifies the idiom. This is used to replace the CCML text representing the original idiom. In addition, the Catome passes a set of words in CCML that express the real meaning of the idiom, in case the idiom identifier has no equivalent idiom in another language. This CCML text is appended to the CCML word with the "Idiom Identifier". (On translation using a Reader, if there is no equivalent idiom in the other language, this alternative CCML is used.)

Linguistic Step 3

The CCML sentence is scanned to identify any CCML component that needs to have specific attributes that the Catome was unable to furnish when the original words were processed. This occurs in two situations:

Pronouns. With a pop-up window, the Editor asks once for each different pronoun if it refers to a masculine, feminine or inanimate object. The gender tag is added to the CCML pronoun. The program assumes the next time that specific pronoun appears that the gender information stands and doesn't need to ask again. If the pronoun does not indicate if one or several people or objects are reflected in the pronoun ("you" in English can mean one or many people) a pop-up window appears to ask the user to clarify. The plurality tag is added to the CCML pronoun.

Unknown words. If the word was unknown to the Catome, and the user chose to use the original word, the Editor does not know about any of the properties the word possesses. A pop-up window appears that invites the user to:

Identify the part of speech (verb, noun, adjective etc.) represented by the unknown word.
Identify if the word is singular, plural and/or possessive if applicable Identify the gender of the word (masculine, feminine or neutral)

Identify if the word is a proper noun (always written starting with a capital letter—like Marek, or Brandon)

If the word is a verb, identify which tense the word-as-verb reflects.

The relevant properties are added as an attribute group to the unknown word.

Linguistic Step 4 (Specific language anomalies processing)

Nouns used as adjectives in English. It is assumed that when it finds a string of separate, contiguous nouns, the last noun is considered to be the "real" noun and those preceding to be nouns acting as adjectives. The user is asked to confirm this if the detailed "verification" option was selected at the beginning of the session. (Other languages may have different anomalies and different processing needs).

Linguistic Step 5

The CCML is now scanned as a complete sentence to see if it matches one of the Sentence Structures in the Sentence Structure database within the Catome. The Editor identifies the main verb or main verb phrase within the CCML text and uses that to narrow its search through the database. Once identified, the Sentence Structure entry contains a coded description of the grammatical components and their positioning within that sentence type. With this coding system, the Editor can understand which CCML word(s) in the input constitute the subject, the object, the indirect object, subordinate clauses and other grammatical components in the sentence. The CCML sentence is tagged with attributes to group the CCML words accordingly.

If the software cannot find the verb phrase and resulting sentence structure, it uses the closest matches in the Sentence Structure database. The user is shown a pop-up window with the original sentence reformed under each closest sentence structure, complete with any important missing words (clause openers such as "that" or "which") and any critical punctuation such as commas to mark the end of a clause. The user is invited to select one of these sentences or to go back and retype the sentence with some helpful hints shown.

Linguistic Step 6

The completed sentence is now displayed in a new pop-up window with each grammatical component color-coded. A key to color coding is displayed indicating which component is colored as the subject, verb phrase, object, indirect object etc. The main and sub-ordinate clauses are also color-coded. Actually, this is very simple to do as the software has matched a specific sentence structure to the original sentence and this grammatical exercise is very simple to perform. Clicking on any of the words in this window will display what part of speech the word represents, be it adjective, adverb, conjunction, noun, verb etc.). The invention may thus provide an impressive grammar learning tool.

The translation of the sentence into CCML is now complete.

Reader Description

Introduction

For every language supported by the preferred embodiment, there is a unique language reader product. These may be distributed free of charge over the Internet to anyone who wants to download them. The Reader is activated as a browser plug-in by clicking on an Icon on any web page or by activating the Reader from a Windows pull-down menu on an E-mail system. The Reader can translate any text created using the Editor on a web page or e-mail flawlessly, automatically and perfectly into the language of the Reader and display it back on the screen.

Functional Step 1

When the Reader is first installed, the User is asked if they want to keep the Catome in compressed or dynamic form. Compressed mode means a disk requirement of 5 Mb, wheras dynamic mode can take upto 30 Mb. The trade-off is speed—the dynamic version will have to be created every time the Reader is subsequently used if the compressed version is stored.

Functional Step 2

The user is asked which regional language version they would like to see their translations. For the English language the choices would be:

UK English

US English

Canadian English

Australian English

Similarly for French, the Reader offers:

Paris French

Quebec French

Belgian French

Swiss French

The user can always change this regional language setting through a pop-up menu at any time.

Functional Step 3—E-mail

The user receives an e-mail and a pop-up menu appears informing the user that the e-mail is translatable using the Reader. The Reader e-mail add-on module has detected that the incoming e-mail message has a CCML component. The user is asked to select one of the following:

Want to read the message in its original language?

Want to read the message in the language of their reader? (If the user has several language readers, the pop-up window would show them all)

If the user selects to use a language reader, the user is asked in which regional language version they would like to see the translation. The CCML component is moved to the input buffer of the Reader and automatically translated in Steps 5–10. The resulting translation is shown on the screen as if it was the original message.

Once read, the user is asked if they want to save the e-mail message as:

Translation only.

Translation and Original Message.

In either case, the CCML component is always saved so that the message can be translated again in another language or at another time in the same language.

The Reader function for e-mail is completed.

Functional Step 4—Web Page

The user surfs the Worldwide Web and finds a web page which has the Icon identifying CCML files displayed. If the user clicks on that icon, a pop-up menu appears informing the user that this web page is readable using the CCML Reader. The Reader browser plug-in module has detected that the current web page has an invisible CCML component. The user is asked to select one of the following:

To read the page in its original language

To read the page in the language of their Reader. (If the user has several language readers, the pop-up window would show them all)

If the user selects to use a language reader, the user is asked in which regional language version they would like to see the translation. The CCML component is moved to the input buffer of the Reader and automatically translated in Steps 5–10. The resulting translation is shown on the screen as if it was the original page. All HTML tags for the original language are respected and retained: this means that the translated text on the web page is formatted in exactly the same manner as that of the original language.

The Reader function for web page translation is completed.

Functional Step 5

The CCML to be translated is contained in the input buffer of the Reader module.

The Reader takes each sentence in turn, translates it and places the result in the output buffer. The processes are described in Steps 6–10 following. Once all sentences have been translated, the contents of the output buffer are moved to the display message function of the e-mail software, or to the stored copy of the web page in the cache of the browser. The e-mail software is triggered to display the message, or the browser's "refresh" function is activated to redisplay the web page.

If the CCML came from a web page, the Reader removes any formatting HTML surrounding each individual CCML and replaces it around each translated sentence within the output buffer. This will allow the text of the translation to be formatted in an identical manner to that of the original language.

Functional Step 6

The Sentence Structure Identifier is located and looked up in the Catome. An equivalent structure is passed back from the Catome that contains information as to the sequence of the grammatical components in which the CCML should be translated and ordered in the translation output. The CCML components are according moved around to match this specification.

Functional Step 7

Each CCML component in the sentence is scanned for an Idiom Identifier. If found, this is passed to the Catome which returns an equivalent idiom in CCML and replaces the Idiom phrase in the original CCML. If no expression is returned, the appended "Idiom Meaning" in the original CCML is used instead to replace the idiom phrase.

Functional Step 8

Clause by clause, the CCML is read for each "Meaning Identifier". These are passed in turn to the Catome which returns the word to be used along with its "Word Identifier" value.

Functional Step 9

The words are altered to "correspond", either in verb tense, gender, subject or object matching, singular and plural. This is done by taking the two-digit "meaning qualifiers" from the original CCML components plus any gender or other attributes associated with that CCML item in the original CCML. An update to the two-digit qualifier to the "Word Identifier" is created, appended and the resulting "Word Identifier" is passed to the Catome. The Catome returns the word to be used, correctly modified.

Functional Step 10

If the "contraction" attribute is present for the sentence, or the language uses formal contractions, any applicable contractions for the words or word combinations are obtained from the Catome and substituted for the uncontracted text. If translating in French for example, the program translates the English "I love" as "Je aime". As French does use formal contraction, this step produces the correct answer of "J'aime" When this is done, the whole sentence is passed to the output buffer of the Reader. The translation is complete.

Although the invention has been described hereinabove in detail with reference to a specific preferred embodiment, it is to be understood that the description of the preferred embodiment is not intended to limit the scope of the present invention.

We claim:

1. A translation system for translating an input text in an essentially unconstrained natural language into a meaning code using input from a user requiring knowledge of said language of said input text, said meaning code to be converted by a machine translation system to an output text in at least one different language, said system comprising:

a parser recognizing sentences and words within said sentences of said input text, said parser locating said words in a term database;

a meaning editor obtaining from a meaning database a plurality of meaning descriptions in said language of said input text for each of at least some of said words having plural meanings for a given part of speech in said term database, said meaning editor receiving from said user a confirmation of which of said plurality of meaning descriptions is appropriate for each said at least some of said words, and said meaning editor receiving from said user an indication of a part of speech of said words in each of said sentences; and a meaning code generator receiving data from said meaning editor and generating a meaning code corresponding to said input text, said meaning code comprising an identification code corresponding to a meaning for each word found in said input text and sufficient grammatical information to allow for said meaning code to be accurately automatically machine translated in any one of said at least one different language.

2. The system as claimed in claim 1, wherein said meaning editor further comprises an input interface allowing a user to provide input in response to at least one of said words in a given said sentence not being found in said term database.

3. The system as claimed in claim 2, wherein said input interface comprises means allowing said user to identify said at least one of said words as untranslatable, said meaning code generator means including in said meaning code a code indicative of untranslatable text and text representing said at least one of said words.

4. The system as claimed in claim 2, wherein said input interface comprises means allowing said user to edit said given sentence, whereby a term or expression which is not found in said term database can be avoided by changing the sentence structure and words.

5. The system as claimed in claim 2, wherein said meaning editor includes thesaurus means and allows said user to select from at least one alternative word or expression obtained from said thesaurus means corresponding to said at least one of said words not found in said term database, whereby said user is assisted in converting words not found in said term database to words having a similar meaning that are found in said term database.

6. The system as claimed in claim 5, wherein said thesaurus means includes means for allowing said user to edit contents of said thesaurus means.

7. The system as claimed in claim 5, wherein said meaning code is a substantially numeric code and includes text representing said at least one word not found in said term database, whereby said meaning code can be converted faithfully into said language of said input text.

8. The system as claimed in claim 1, wherein said meaning code is a substantially numeric code.

9. The system as claimed in claim 8, wherein said substantially numeric code comprises numeric word-identifiers each having a prefix identifying a part of speech, a unique identifier within the identified part of speech, and a suffix identifying a way in which a modifiable part of speech is being used.

10. The system as claimed in claim 9, wherein said meaning code includes text representing said words within said sentences of said input text, whereby said meaning code can be converted faithfully into said language of said input text.

11. The system as claimed in claim 1, wherein said input text is in a markup language format and said meaning code generator includes in said meaning code markup codes permitting said meaning code to be machine translated into said at least one different language and converted into said markup language format, whereby said meaning code is able to be machine translated and viewed using an Internet browser including a plug-in program for translating and converting said meaning code.

12. The system as claimed in claim 1, further comprising:
means for adding a new entry in said term database and to link said new entry to at least one meaning description in said meaning database, whereby a quality of the term database can be developed with use of said system.

13. The system as claimed in claim 1, further comprising:
means for editing said term database to change links between entries in said term database and meaning descriptions in said meaning database, whereby a quality of links between terms in the term database and the meanings in the meaning database can be developed with use of said system.

14. The system as claimed in claim 1, wherein said meaning editor receiving from said user an indication of a part of speech of said words in each of said sentences prompts said user to provide grammatical information not required by said language of said input text and useful in providing an accurate translation into at least one of said at least one different language, said at least one different language being at least two in number.

15. The system as claimed in claims 1, wherein said meaning editor includes:
a sentence structure database containing data defining a number of generic sentence structures acting as a model determining where grammatical components of a sentence are to be found and relationships between said grammatical components; and
a user input interface receiving from said user an indication of which one of said number of generic sentence structures applies to at least some of said sentences, said meaning code further comprising sentence structure data.

16. A method of human-assisted machine translating an input text in one essentially unconstrained natural language to obtain an output text in at least one different language, the method comprising the steps of:
defining a part of speech and a meaning of words in each sentence of said input text using an editor in said language of said input text, said meaning defined for each one of said words being derived from a predetermined meaning database having a set of meanings and corresponding meaning codes, at least some of said words having a set of plural meanings in said meaning database for a same part of speech;
storing information including meaning codes derived from the previous step in a meaning code file;
providing a machine translator apparatus for machine translating said meaning code file to one of said at least one different language, said translator apparatus including a database of translated terms corresponding to said meaning codes; and
automatically generating said output text from said meaning code file using said machine translator apparatus.

17. The method as claimed in claim 16, wherein said step of storing comprises electronic transmission of said meaning code file to a remote location at which said machine translator apparatus is located.

18. The method as claimed in claim 16, wherein said step of defining includes prompting a user to provide grammatical information not required by said language of said input text and useful in providing an accurate translation into at least one of said at least one different language, said at least one different language being at least two in number.

19. The method as claimed in claim 16, wherein:
said step of defining further comprises selecting one of a number of generic sentence structures acting as a model determining where grammatical components of a sentence are to be found and relationships between said grammatical components which applies to at least some of said sentences;
said meaning code file further comprises sentence structure data; and
said machine translator apparatus further comprises a database of said generic sentence structures; and
said generating of said output text also uses said sentence structure data for those sentences having said selected generic sentence structure.

* * * * *